US011910832B2

(12) United States Patent
Liu

(10) Patent No.: US 11,910,832 B2
(45) **Date of Patent: *Feb. 27, 2024**

(54) HIGH-FREQUENCY HEATING HANDLE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 442 days.

This patent is subject to a terminal disclaimer.

(21) Appl. No.: 17/115,843

(22) Filed: Dec. 9, 2020

(65) Prior Publication Data

US 2022/0125116 A1 Apr. 28, 2022

(30) Foreign Application Priority Data

Oct. 25, 2020 (CN) ......................... 202011151202.8
Oct. 25, 2020 (CN) ........................ 202022389626.X

(51) Int. Cl.

| | |
|---|---|
| *A24F 47/00* | (2020.01) |
| *A24F 40/465* | (2020.01) |
| *A24F 40/48* | (2020.01) |
| *A24F 40/20* | (2020.01) |
| *A24F 40/57* | (2020.01) |
| *A24F 40/51* | (2020.01) |
| *A24F 40/60* | (2020.01) |
| *A24F 1/24* | (2006.01) |
| *A24F 1/30* | (2006.01) |

(Continued)

(52) U.S. Cl.
CPC .............. *A24F 40/465* (2020.01); *A24F 1/24* (2013.01); *A24F 1/30* (2013.01); *A24F 5/00* (2013.01); *A24F 40/20* (2020.01); *A24F 40/48* (2020.01); *A24F 40/51* (2020.01); *A24F 40/57* (2020.01); *A24F 40/60* (2020.01); *H05B 6/06* (2013.01); *H05B 6/105* (2013.01); *H05B 6/36* (2013.01)

(58) Field of Classification Search
CPC ...................................................... A24F 40/465
See application file for complete search history.

(56) References Cited

U.S. PATENT DOCUMENTS

2021/0360965 A1* 11/2021 Liu ........................... A24F 1/30

FOREIGN PATENT DOCUMENTS

CN 106998810 A * 8/2017 ........... A24B 15/167
CN 110139686 A * 8/2019 ............. A24F 40/50
CN 209449669 U * 10/2019

OTHER PUBLICATIONS

Zheng, Zhu; CN209449669 English Translation; Jan. 18, 2023; Obtained from European Patent Office (Year: 2023).*

(Continued)

*Primary Examiner* — Eric Yaary
(74) *Attorney, Agent, or Firm* — MATTHIAS SCHOLL P.C.; Matthias Scholl

(57) ABSTRACT

A high-frequency heating handle includes a heating assembly and a handle assembly. The heating assembly includes a heating cup for accommodating a tobacco material. The handle assembly includes a housing and a magnetic induction coil disposed in the housing. The housing includes a through hole, and the heating cup is disposed in the through hole. When alternating current passes through the magnetic induction coil, a magnetic induction effect is produced, and the heating cup is heated whereby a smoke material in the heating cup is heated to produce smoke.

11 Claims, 3 Drawing Sheets

(51) Int. Cl.

| | |
|---|---|
| ***A24F 5/00*** | (2006.01) |
| ***H05B 6/06*** | (2006.01) |
| ***H05B 6/10*** | (2006.01) |
| ***H05B 6/36*** | (2006.01) |

(56) References Cited

OTHER PUBLICATIONS

Soriano, Anavi, Prot; CN110139686 English Translation; Jan. 18, 2023; Obtained from European Patent Office (Year: 2023).*

Great White North Vaporizer Company, The Reaper Mini Bong For DynaVap—Product Demo | GWNVC's Vaporizer Reviews, Jan. 17, 2020, YouTube.com, https://www.youtube.com/watch?v=ztaMWDfjXJQ (Year: 2020).*

GinstersPasties, VapCap / OmniVap Portable Induction Heater 18650, Apr. 2, 2019, Youtube.com, https://www.youtube.com/watch?v=3LHpZoZuuU4 (Year: 2019).*

Zhu Chunlan, Zheng Chenglong; Device and smoking set for low-temperature baking without burning formed by cutting of electromagnetic induction magnetic field—English Translation ; Jun. 13, 2023; European Patent Office (Year: 2023).*

Adair Kyle, Aerosol generating device—English Translation, Jun. 13, 2023, European Patent Office (Year: 2023).*

* cited by examiner

HIGH-FREQUENCY HEATING HANDLE

CROSS-REFERENCE TO RELATED APPLICATIONS

Pursuant to 35 U.S.C. § 119 and the Paris Convention Treaty, this application claims foreign priority to Chinese Patent Application No. 202011151202.8 filed on Oct. 25, 2020, and to Chinese Patent Application No. 202022389626.X filed on Oct. 25, 2020. The contents of all of the aforementioned applications, including any intervening amendments thereto, are incorporated herein by reference.

BACKGROUND

The disclosure relates to a high-frequency heating handle.

Conventionally, when a high-frequency heating device is combined with a hookah for heating a tobacco material, the high-frequency heating device is held by users to heat the tobacco material in the hookah. In addition, the conventional high-frequency heating device has no over-temperature protection function.

SUMMARY

The disclosure provides a high-frequency heating handle, comprising a heating assembly and a handle assembly; the heating assembly comprises a heating cup for accommodating a tobacco material; the handle assembly comprises a housing and a magnetic induction coil disposed in the housing; the housing comprises a through hole, and the heating cup is disposed in the through hole; when an alternating current passes through the magnetic induction coil, a magnetic induction effect is produced, and the heating cup is heated whereby a smoke material in the heating cup is heated to produce smoke.

In a class of this embodiment, the handle assembly further comprises a heat insulation ring disposed in the magnetic induction coil.

In a class of this embodiment, the handle assembly further comprises a variable-frequency power source and a battery; an output end of the battery is connected to an input end of the variable-frequency power source; an output end of the variable-frequency power source is soldered on the magnetic induction coil; in a power on state, an alternating current output from the variable-frequency power source flows through the magnetic induction coil to produce an induced magnetic field.

In a class of this embodiment, the handle assembly further comprises a temperature difference sensor soldered on the variable-frequency power source and is in the vicinity of a top opening of the heat insulation ring to sense the temperature of the airflow, thus controlling the variable-frequency power source whether or not to enter an automatic heating mode.

In a class of this embodiment, the handle assembly further comprises a thermistor soldered on the variable-frequency power source and located in the heat insulation ring for over-temperature protection; when a working temperature of the heating handle reaches a set value, the variable-frequency power source stops working.

In a class of this embodiment, the handle assembly further comprises a mode switching button and a switch button; the switch button is disposed on the variable-frequency power source to start the heating of the tobacco material; the mode switching button is disposed on the variable-frequency power source to switch a working mode of the heating handle to heat different types of tobacco materials.

In a class of this embodiment, the heating assembly further comprises a nozzle disposed on the heating cup.

In a class of this embodiment, the heating cup is made of glass, ceramics, quartz, crystal, mica, and jade inlaid with a metal conductor.

In a class of this embodiment, the nozzle comprises a vertical air passage; a cross sectional area of the vertical air passage is variable by manually covering part of the nozzle thereby controlling amount of smoke produced in the heating cup.

In a class of this embodiment, a smoke filter is connected to the heating assembly; the smoke filter is configured to filter the smoke produced in the heating assembly.

In a class of this embodiment, the heat insulation ring is nested in the heating cup.

In a class of this embodiment, the heating cup comprises an air passage; the air enters the heating cup via the nozzle and drives the smoke produced in the heating cup to enter the smoke filter where the smoke is filtered by water.

DETAILED DESCRIPTION

To further illustrate, embodiments detailing a high-frequency heating handle are described below. It should be noted that the following embodiments are intended to describe and not to limit the disclosure.

Principle of high frequency heating: when an alternating current is introduced to a magnetic induction coil, an alternating magnetic field will be generated. When a metal conductor is placed in the alternating magnetic field, an eddy current is produced. The eddy current makes the metal conductor heated.

Tobacco materials refer to tobacco tar, tobacco paste, tobacco leaf and other materials used to produce smoke.

Figure 1:
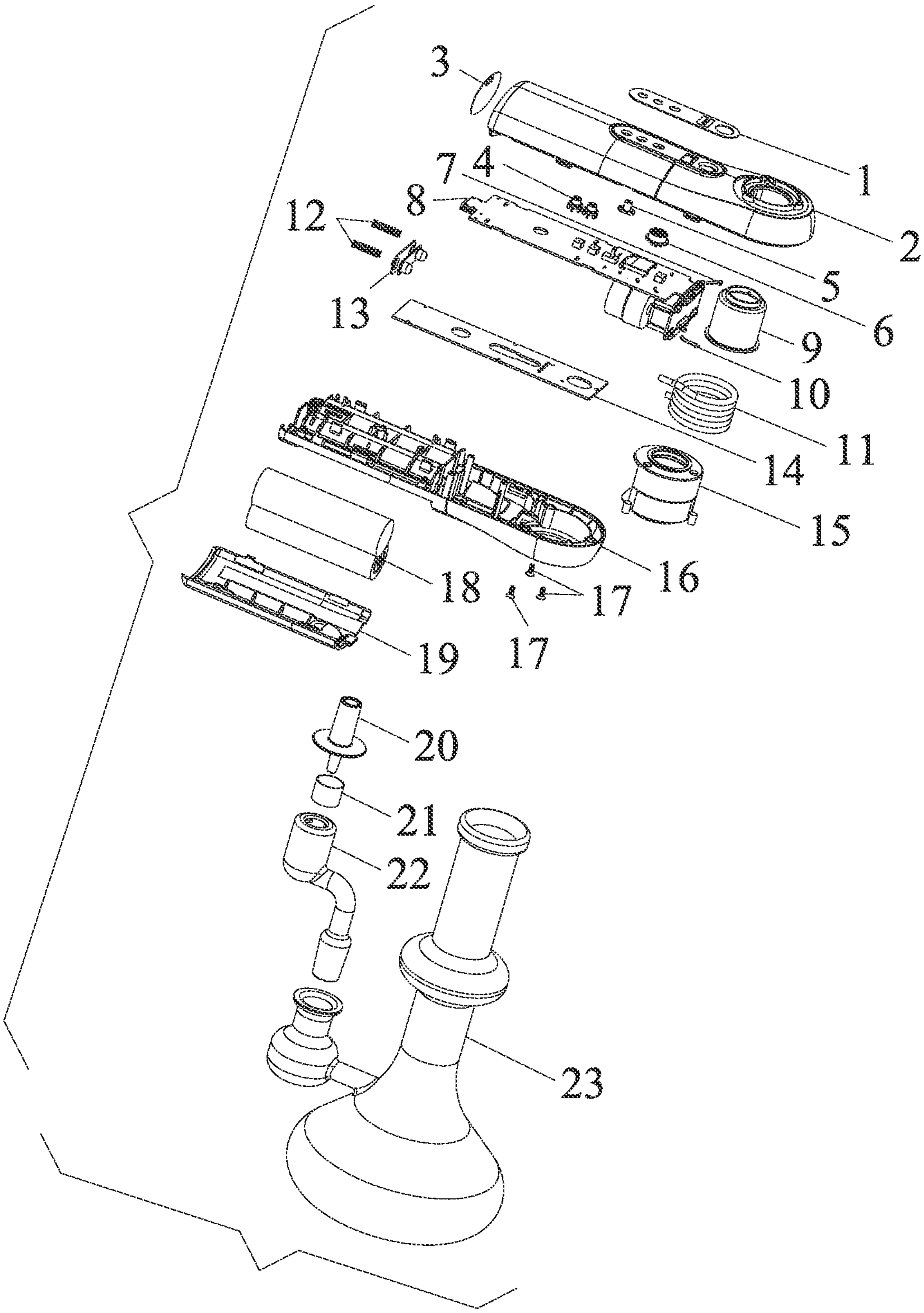
FIG. 1 is an exploded view of a high-frequency heating handle in accordance with one embodiment of the disclosure.
Figure 2:
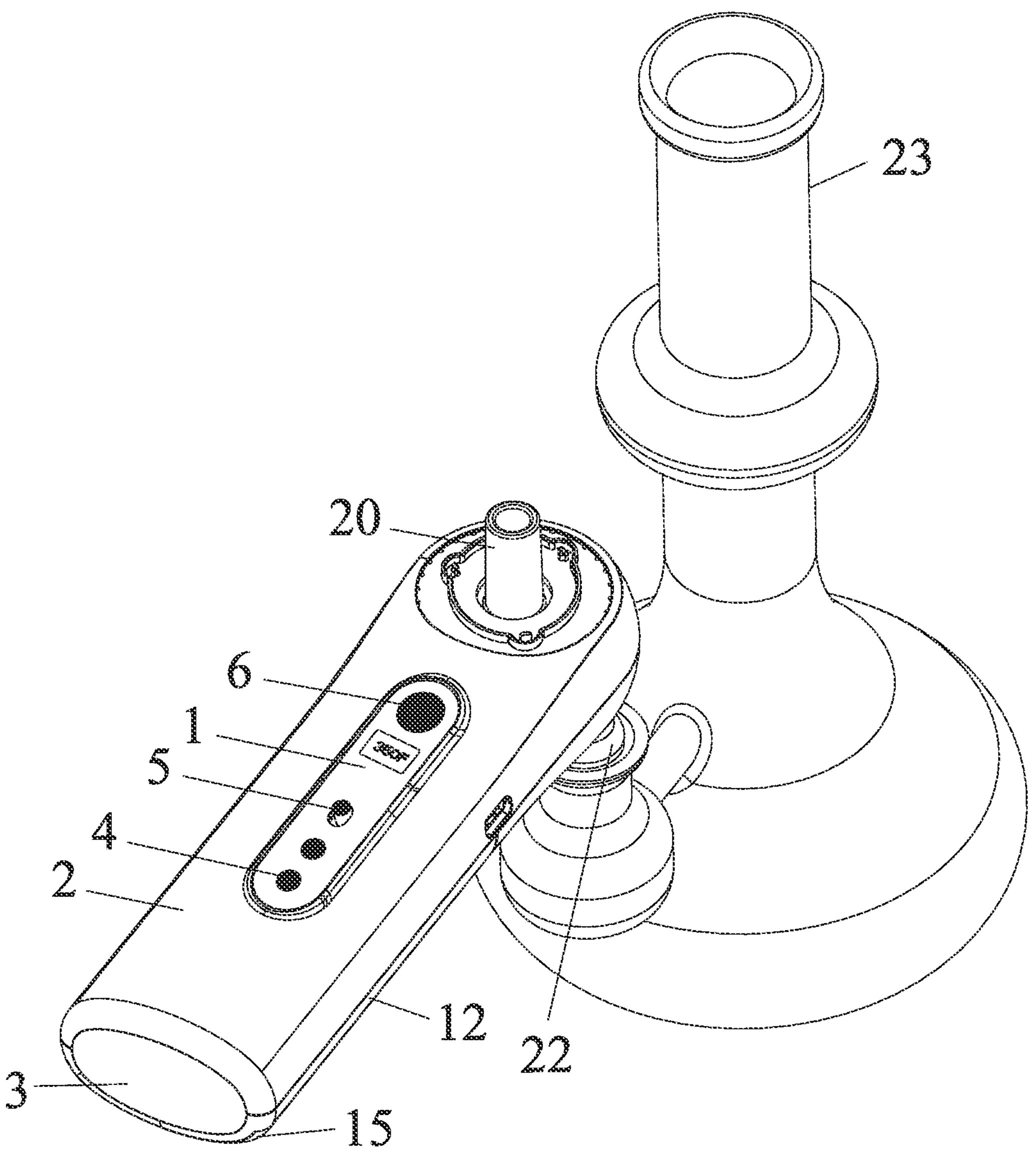
FIG. 2 is a schematic diagram of a high-frequency heating handle in accordance with one embodiment of the disclosure.
Figure 3:
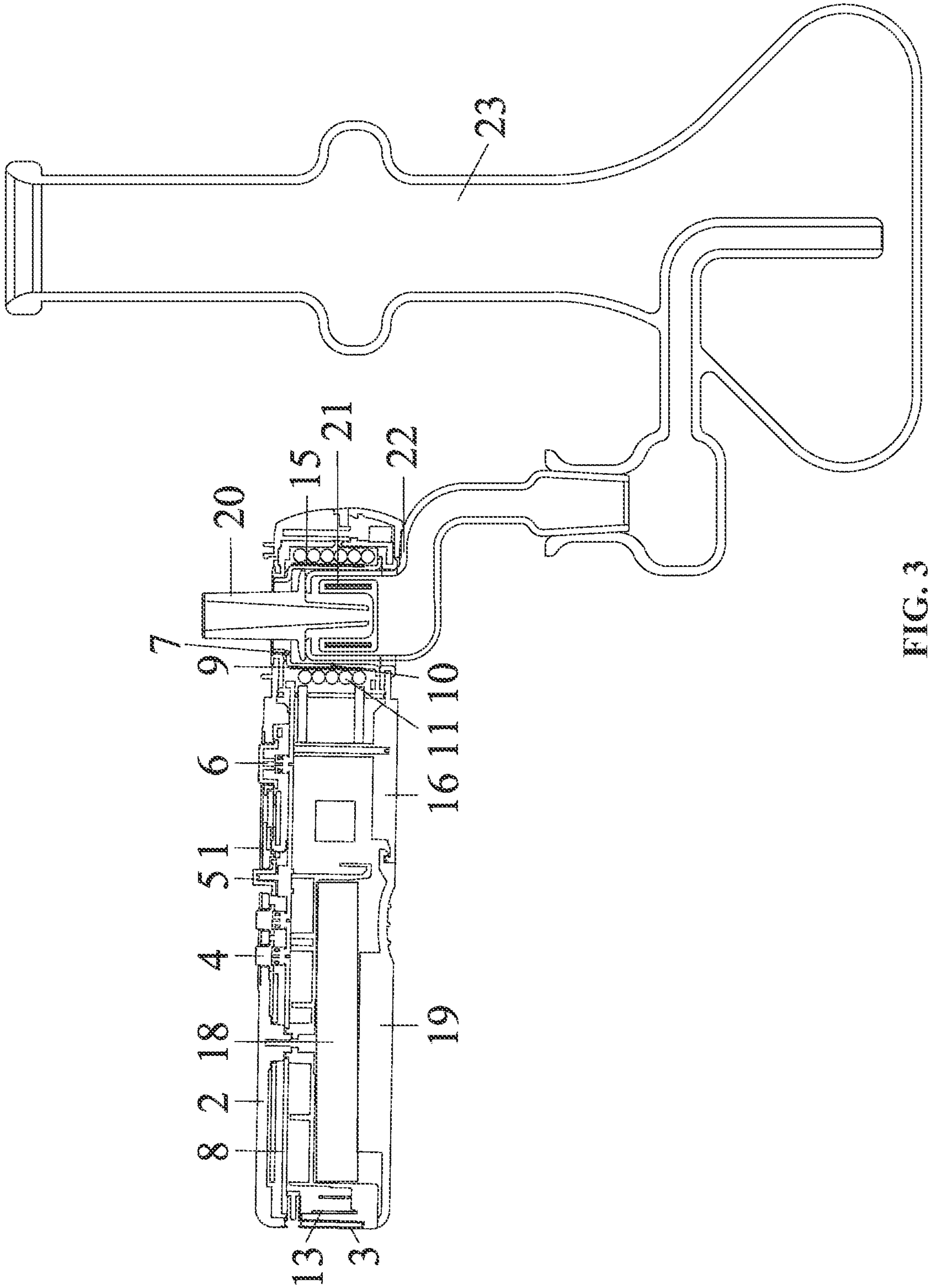
FIG. 3 is a sectional view of a high-frequency heating handle in accordance with one embodiment of the disclosure.

As shown in FIGS. 1-3, the disclosure provides a high-frequency heating handle, comprising a display glass 1, an upper cover 2, a rear cover 3, a power regulation button 4, a mode switching button 5, a switch button 6, a temperature difference sensor 7, a variable-frequency power source 8, a heat insulation ring 9, a thermistor 10, a magnetic induction coil 11, a spring 12, an electrode sheet 13, a heat sink 14, a heat insulation silicone sleeve 15, a lower cover 16, a plurality of screws 17, a battery 18, and a battery cover 19. The heat insulation ring 9 is disposed in the magnetic induction coil 11 to protect and insulate the magnetic induction coil. The heat insulation silicone sleeve 15 is disposed outside the magnetic induction coil 11 for thermal insulation. The temperature difference sensor 7 is soldered on the variable-frequency power source 8 and is in the vicinity of the top opening of the heat insulation ring 9 to sense the temperature of the airflow, thus controlling the variable-frequency power source 8 whether or not to enter an automatic heating mode. The thermistor 10 is soldered on the variable-frequency power source 8 and is located in the heat insulation ring 9 for over-temperature protection. When the working temperature of the heating handle reaches a set value, the variable-frequency power source 8 stops working. The output end of the variable-frequency power source 8 is soldered on the input end of the magnetic induction coil 11 to supply alternating current to the magnetic induction coil 11. The variable-frequency power source 8 and the magnetic induction coil 11 are fixed in the lower cover 16 of the handle. The switch button 6 is disposed on the variable-frequency power source 8 to start the heating of the tobacco material. The mode switching button 5 is disposed on the variable-frequency power source 8 to switch the working mode of the heating handle to heat different types of tobacco materials. The power regulation button 4 is disposed on the variable-frequency power source 8 to adjust the output power of the variable-frequency power source. The heat sink 14 is attached to the variable-frequency power source 8 for heat dissipation. The electrode sheet 13 is secured to the rear end of the lower cover 16 and directly contacts the positive and negative terminals of the battery 18. The spring 12 is fixed on the electrode sheet 13 to push the electrode sheet 13 to contact the positive and negative terminals of the battery 18 by elastic force. The upper cover 2 is fixed on the lower cover 16 through the plurality of screws 17. The power regulation button 4 and the switch button 6 are exposed out of the surface of the upper cover 2. The battery 18 is disposed in a groove of the lower cover 16. The battery cover 19 is disposed on the lower cover 16 to support the battery 18. The rear cover 3 is disposed on the rear end of the upper cover 2. The display glass 1 is disposed on the upper cover 2.

In certain embodiments, the high-frequency heating handle is combined with a heating assembly for heating a tobacco material. The heating assembly comprises a nozzle 20 and a heating cup 22. The nozzle 20 is disposed on the heating cup 22. The heating cup 22 comprises a metal conductor 21. When in use, the high-frequency heating handle is disposed on the heating cup 22. In the power on state, an eddy current is produced in the metal conductor in the induction magnetic field of the magnetic induction coil 11 whereby the metal conductor is heated up, and then the heat is transferred to the heating cup 22 through heat transfer to heat the tobacco material in the heating cup 22 to produce smoke.

Specifically, the heating assembly is disposed on a smoke filter 23. In the smoking process, the air enters the heating cup 22 via the nozzle 20 and drives the smoke produced in the heating cup 22 to enter the smoke filter 23 where the smoke is filtered by water and then flows out of the exit of the smoke filter for user's inhaling.

The following advantages are associated with the high-frequency heating handle of the disclosure:

1. The heating cup is independent from the high frequency heating handle and is connected to the high frequency heating handle when in use, so the produced smoke does not flow to the high frequency heating handle, which is environmentally friendly.

2. The high frequency heating handle is compact and easy to carry.

3. The high frequency heating handle comprises the temperature difference sensor which senses the temperature of the airflow, thus controlling the variable-frequency power source whether or not to enter an automatic heating mode.

4. The mode switching button is disposed on the variable-frequency power source to switch the working mode of the heating handle to heat different types of tobacco materials. The power regulation button is disposed on the variable-frequency power source to adjust the output power of the variable-frequency power source.

It will be obvious to those skilled in the art that changes and modifications may be made, and therefore, the aim in the appended claims is to cover all such changes and modifications.

What is claimed is:

1. A heating device, the heating device comprising a heating assembly and a handle assembly; wherein:

the heating assembly comprises a heating cup for accommodating a tobacco material;

the handle assembly is detachable from the heating assembly, and comprises a housing and a magnetic induction coil disposed in the housing;

the housing comprises a through hole, and the heating cup is disposed in the through hole;

the heating cup is glass, ceramics, quartz, crystal, mica, or jade;

the heating cup comprises a columnar part, and a closed cavity in a side wall of the columnar part, and a metal conductor is disposed in the closed cavity; and the magnetic induction coil is disposed around the columnar part of the heating cup.

2. The heating device of claim 1, wherein the handle assembly further comprises a heat insulation ring disposed between the heating cup and the magnetic induction coil.

3. The heating device of claim 2, wherein the handle assembly further comprises a variable-frequency power source and a battery; an output end of the battery is connected to an input end of the variable-frequency power source; an output end of the variable-frequency power source is soldered on the magnetic induction coil; in a power on state, an alternating current output from the variable-frequency power source flows through the magnetic induction coil to produce an induced magnetic field.

4. The heating device of claim 3, wherein the handle assembly further comprises a temperature difference sensor soldered on the variable-frequency power source and is disposed in a top opening of the heat insulation ring to sense a temperature of an airflow, thus controlling the variable-frequency power source whether or not to enter an automatic heating mode.

5. The heating device of claim 4, wherein the handle assembly further comprises a thermistor soldered on the variable-frequency power source and located in the heat insulation ring for over-temperature protection; when a working temperature of the heating handle reaches a set value, the variable-frequency power source stops working.

6. The heating device of claim 5, wherein the handle assembly further comprises a mode switching button and a switch button; the switch button is disposed on the variable-frequency power source to start the heating of the tobacco material; the mode switching button is disposed on the variable-frequency power source to switch a working mode of the heating device to heat different types of tobacco materials.

7. The heating device of claim 1, wherein the heating assembly further comprises a nozzle disposed on the heating cup.

8. The heating device of claim 7, wherein the nozzle comprises a vertical air passage; a cross sectional area of the vertical air passage is variable by manually covering part of the nozzle thereby controlling amount of smoke produced in the heating cup.

9. The heating device of claim 1, wherein a smoke filter is connected to the heating assembly; the smoke filter is configured to filter the smoke produced in the heating assembly.

10. The heating device of claim 2, wherein the heat insulation ring is nested in the heating cup.

11. The heating device of claim 10, wherein the heating cup comprises an air passage; the air enters the heating cup via the nozzle and drives the smoke produced in the heating cup to enter the smoke filter where the smoke is filtered by water.

* * * * *